United States Patent
Gabriels et al.

(10) Patent No.: US 10,751,917 B2
(45) Date of Patent: Aug. 25, 2020

(54) POLYMER COMPOSITIONS, ARTICLES MADE FROM SUCH COMPOSITIONS AND METHODS FOR MOLDING SUCH COMPOSITIONS

(71) Applicant: Milliken & Company, Spartanburg, SC (US)

(72) Inventors: Bart R. Gabriels, Olsene (BE); Daan P. Vanwynsberghe, Ingelmunster (BE); Nathan A. Mehl, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 118 days.

(21) Appl. No.: 15/600,171

(22) Filed: May 19, 2017

(65) Prior Publication Data
US 2017/0341269 A1     Nov. 30, 2017

Related U.S. Application Data

(60) Provisional application No. 62/343,790, filed on May 31, 2016.

(51) Int. Cl.
| | |
|---|---|
| *B29B 11/14* | (2006.01) |
| *B29C 49/04* | (2006.01) |
| *B29B 11/10* | (2006.01) |
| *B29C 49/00* | (2006.01) |
| *B29C 49/70* | (2006.01) |
| *C08L 23/12* | (2006.01) |
| *C08K 5/00* | (2006.01) |
| *C08L 27/18* | (2006.01) |
| *C08L 23/10* | (2006.01) |
| *C08L 23/14* | (2006.01) |
| *B29K 23/00* | (2006.01) |

(52) U.S. Cl.
CPC .............. *B29B 11/14* (2013.01); *B29B 11/10* (2013.01); *B29C 49/0005* (2013.01); *B29C 49/04* (2013.01); *B29C 49/70* (2013.01); *C08K 5/00* (2013.01); *C08L 23/10* (2013.01); *C08L 23/12* (2013.01); *C08L 23/14* (2013.01); *C08L 27/18* (2013.01); *B29K 2023/12* (2013.01); *C08J 2323/14* (2013.01); *C08J 2427/20* (2013.01); *C08L 2666/04* (2013.01)

(58) Field of Classification Search
CPC .................................................. B29C 49/0005
See application file for complete search history.

(56) References Cited

U.S. PATENT DOCUMENTS

| | | | |
|---|---|---|---|
| 3,125,547 A | 3/1964 | Blatz | |
| 4,161,579 A * | 7/1979 | Edelman | C08G 63/80 264/319 |
| 4,829,116 A | 5/1989 | Piesold | |
| 5,614,319 A | 3/1997 | Wessels et al. | |
| 5,707,569 A | 1/1998 | Priester et al. | |
| 5,804,654 A | 9/1998 | Lo et al. | |
| 6,040,370 A | 3/2000 | Wozny et al. | |
| 6,384,123 B1 | 5/2002 | Young | |
| 6,547,094 B1 | 4/2003 | Jacobs | |
| 7,001,951 B2 | 2/2006 | Chapman, Jr. et al. | |
| 7,157,510 B2 | 1/2007 | Xie et al. | |
| 7,420,010 B2 | 9/2008 | Sikhadia et al. | |
| 8,945,460 B2 | 2/2015 | Bernreitner et al. | |
| 2004/0014861 A1 | 1/2004 | Hatzikiriakos et al. | |
| 2004/0156106 A1 | 8/2004 | Allen et al. | |
| 2004/0254268 A1 | 12/2004 | Cernohous et al. | |
| 2005/0203264 A1 | 9/2005 | Musgrave et al. | |
| 2006/0173108 A1 | 8/2006 | Xu et al. | |
| 2006/0287430 A1 | 12/2006 | Amos et al. | |
| 2008/0139718 A1 | 6/2008 | Reyntjens et al. | |
| 2010/0119751 A1 | 5/2010 | Lanier | |
| 2010/0260995 A1 | 10/2010 | Pellegatti et al. | |
| 2010/0301525 A1 * | 12/2010 | Price | B29C 49/0005 264/540 |

FOREIGN PATENT DOCUMENTS

| | | |
|---|---|---|
| EP | 0 385 199 A2 | 2/1990 |
| EP | 0 524 404 A1 | 5/1992 |
| JP | 08-239525 | 9/1996 |
| RU | 2352597 C1 | 6/2008 |
| WO | WO 1995/21887 | 8/1995 |
| WO | WO 2000/69967 | 11/2000 |
| WO | WO 2000/069967 | 11/2000 |
| WO | WO 2001/034690 A1 | 5/2001 |
| WO | WO 2002/074859 A1 | 9/2002 |
| WO | WO 2006/062956 A2 | 6/2006 |
| WO | WO 2008/073401 A1 | 6/2008 |
| WO | WO 2009/058313 A1 | 5/2009 |
| WO | WO 2009/077287 A1 | 6/2009 |

OTHER PUBLICATIONS

Dynamar "*Polymer Processing Additives FX 5911*", Technical Information, 2 pages, Dyneon a 3M Company, USA 98/0504-1422-0.

Zweifel, Hans et al., "*Plastics Additives Handbook*" Hanser Publishers, Munich, 5th Edition, p. 565-567.

Amos, Stephen E. et al., Dynamar "*The Application of Polymer Processing Additives (PPAs) for Polypropylene Film: Processing Benefits without Affecting Printing, Sealing and Other Surface Properties*" No. 26., 2001.

(Continued)

*Primary Examiner* — Wenwen Cai
(74) *Attorney, Agent, or Firm* — Robert M. Lanning

(57) ABSTRACT

A polymer composition comprises a thermoplastic polymer, a polymer additive selected from the group consisting of nucleating agents, clarifying agents, and combinations thereof, and a fluoropolymer. A molded article comprises at least one wall defining a cavity, the wall having an opening therein permitting access to the cavity. The wall comprises a polymer composition comprising a thermoplastic polymer, a polymer additive selected from the group consisting of nucleating agents, clarifying agents, and combinations thereof, and a fluoropolymer. A method for molding a polymer composition is also provided.

11 Claims, No Drawings

(56) References Cited

OTHER PUBLICATIONS

Romankiewicz, Anna et al., "*Structural Characterization of α- and β-Nucleated Isotactic Polypropylene*" 2004 Society of Chemical Industry. Polym Int. 53: 2086-2091 (2004).
Sherman, Lilli Manolia, "*New Clarifiers*" Jul. 2002, www.plasticstechnology.com., 2002.
Migler, K.B., et al., "*Visualizing the Elimination of Sharkskin Through Fluoropolymer Additives: Coating and Polymer-Polymer Slippage*" L. Rheol. 45(2), Mar./Apr. 2001, pp. 565-581.
International Search Report of PCT/US2017/033567 filed on May 19, 2017, 4 pages.
Written Opinion of the International Searching authority for PCT/US2017/033567 filed on May 19, 2017, 6 pages.

\* cited by examiner

POLYMER COMPOSITIONS, ARTICLES MADE FROM SUCH COMPOSITIONS AND METHODS FOR MOLDING SUCH COMPOSITIONS

CROSS-REFERENCE TO RELATED APPLICATIONS

This application claims, pursuant to 35 U.S.C. § 119(e), priority to and the benefit of the filing date of U.S. Patent Application No. 62/343,790, which was filed on May 31, 2016.

TECHNICAL FIELD OF THE INVENTION

This invention relates to polymer compositions, articles made from such polymer compositions, and methods for molding such polymer compositions.

BRIEF SUMMARY OF THE INVENTION

As noted above, the present invention is generally directed to polymer compositions, articles (e.g., molded articles) made from such polymer compositions, and methods for molding such polymer compositions. When used in forming molded articles, such as an extrusion blow molded article, the polymer composition of the invention, which includes a synergistic blend of a polymer additive and a fluoropolymer and possesses certain desired melt characteristics (e.g., apparent melt viscosity), is believed to be particularly well-suited for the production of molded articles exhibiting desirable optical properties (e.g., haze and gloss). In particular, molded articles produced using the polymer composition of the invention are believed to exhibit a desirable combination of low haze and high gloss as compared to articles made using other polymer compositions. In view of these optical properties, the polymer composition of the invention and molded articles formed therefrom are believed to be particularly desirable for use in packaging and food containers.

While not wishing to be bound to any particular theory, it is believed that the nucleating or clarifying agent acts to provide the bulk or interior portions of the polymer with desirable optical properties (e.g., low haze), while the fluoropolymer works in concert with the nucleating or clarifying agent to provide a molded article having desirable surface properties, such as high gloss. More specifically, it is believed that the fluoropolymer acts to coat the working surfaces of the machinery used to process the polymer composition and that the polymer composition flows more smoothly and with a higher velocity in the vicinity of these coated surfaces. Furthermore, it is believed that the inclusion of the nucleating agent or clarifying agent reduces the size of the crystals that form as the polymer cools from the plasticized (molten) state and that this smaller crystal size creates less pronounced and smaller disturbances in the polymer surface. Lastly, it is believed that the melt characteristics of the polymer composition (as indicated by the apparent melt viscosity) provide a polymer composition that exhibits the right balance of properties for both the extrusion step and blow molding step. In particular, the polymer composition exhibits a relatively low melt viscosity during the extrusion step and it is believed that this correlates to relatively low shear stress on the die wall, which means that less of the fluoropolymer coating is removed from the die wall during the extrusion step. Also, the polymer composition exhibits a relatively low viscosity under the low shear stress conditions experienced when the parison is blown and expands towards the surface of the mold cavity. It is believed that this relatively low viscosity allows the polymer composition to better match the texture of the mold finish (which is typically polished to a high gloss) and also allows the surfaces of the parison to level or smooth out and thus reduce surface haze. However, the viscosity of the polymer composition is not so low under these low shear conditions that the parison cannot support itself.

In a first embodiment, the invention provides a polymer composition comprising:
(a) a thermoplastic polymer;
(b) a polymer additive selected from the group consisting of nucleating agents, clarifying agents, and combinations thereof; and
(c) a fluoropolymer,
wherein the polymer composition has (i) an apparent melt viscosity of about 200 Pa·s or less at an apparent shear rate of 1,000 $s^{-1}$ and a temperature of 190° C., and (ii) an apparent melt viscosity of 2,550 Pa·s or less at an apparent shear rate of 20 $s^{-1}$ and a temperature of 190° C.

In a second embodiment, the invention provides a molded thermoplastic article comprising at least one wall defining a cavity, the wall having an opening therein permitting access to the cavity and comprising a polymer composition comprising a thermoplastic polymer, a polymer additive selected from the group consisting of nucleating agents, clarifying agents, and combinations thereof, and a fluoropolymer. The polymer composition preferably has (i) an apparent melt viscosity of about 200 Pa·s or less at an apparent shear rate of 1,000 $s^{-1}$ and a temperature of 190° C., and (ii) an apparent melt viscosity of 2,550 Pa·s or less at an apparent shear rate of 20 $s^{-1}$ and a temperature of 190° C.

In a third embodiment, the invention provides a method for making a polymer composition, the method comprising the steps of:
(a) providing a first thermoplastic polymer;
(b) providing a masterbatch composition, the masterbatch composition comprising: (i) a second thermoplastic polymer, (ii) a polymer additive selected from the group consisting of nucleating agents, clarifying agents, and combinations thereof; and (iii) a fluoropolymer; and
(c) mixing the first thermoplastic polymer and the masterbatch composition to produce a polymer composition, wherein the polymer composition has (i) an apparent melt viscosity of about 200 Pa·s or less at an apparent shear rate of 1,000 $s^{-1}$ and a temperature of 190° C., and (ii) an apparent melt viscosity of 2,550 Pa·s or less at an apparent shear rate of 20 $s^{-1}$ and a temperature of 190° C.

In a fourth embodiment, the invention provides a method for molding a polymer composition. In particular, the method comprises the steps of:
(a) providing an apparatus comprising a die and a mold cavity, the mold cavity having an interior surface defining a shape for a molded article;
(b) providing a polymer composition comprising (i) a thermoplastic polymer; (ii) a polymer additive selected from the group consisting of nucleating agents, clarifying agents, and combinations thereof; and (iii) a fluoropolymer, wherein the polymer composition has (i) an apparent melt viscosity of about 200 Pa·s or less at an apparent shear rate of 1,000 $s^{-1}$ and a temperature of 190° C., and (ii) an apparent melt viscosity of 2,550 Pa·s or less at an apparent shear rate of 20 $s^{-1}$ and a temperature of 190° C.;
(c) heating the polymer composition to a temperature sufficient to melt the polymer composition so that it may be extruded through the die;

(d) extruding the molten polymer composition through the die to form a parison;

(e) capturing the parison in the mold cavity;

(f) blowing a pressurized fluid into the parison under sufficient pressure to inflate the parison so that it conforms to the interior surface of the mold cavity and produces a molded article;

(g) allowing the molded article to cool to a temperature at which the polymer composition at least partially solidifies so that the molded article retains its shape; and (h) removing the molded article from the mold cavity.

DETAILED DESCRIPTION OF THE INVENTION

In a first embodiment, the invention provides a polymer composition comprising a thermoplastic polymer, a polymer additive selected from the group consisting of nucleating agents, clarifying agents, and combinations thereof, and a fluoropolymer.

The polymer composition can contain any suitable polymer. For example, the polymer composition can contain a thermoplastic polymer, such as a polyolefin. Suitable polyolefins include, but are not limited to, polypropylene homopolymers, polypropylene copolymers (e.g., polypropylene random copolymers), polypropylene impact copolymers, and combinations thereof. Suitable polypropylene copolymers include, but are not limited to, random copolymers made from the polymerization of propylene in the presence of a comonomer selected from the group consisting of ethylene, but-1-ene (i.e., 1-butene), and hex-1-ene (i.e., 1-hexene). In such polypropylene random copolymers, the comonomer can be present in any suitable amount, but typically is present in an amount of less than about 10 wt. % (e.g., about 1 to about 7 wt. %). Suitable polypropylene impact copolymers include, but are not limited to, those produced by the addition of a copolymer selected from the group consisting of ethylene-propylene rubber (EPR), ethylenepropylene-diene monomer (EPDM), polyethylene, and plastomers to a polypropylene homopolymer or polypropylene random copolymer. In such polypropylene impact copolymers, the copolymer can be present in any suitable amount, but typically is present in an amount of from about 5 to about 25 wt. %. In certain possibly preferred embodiments, the polymer is a polypropylene random copolymer made from the copolymerization of propylene and ethylene, with the amount of ethylene being from about 1 to about 7 wt. %.

As noted above, the polymer additive is selected from the group consisting of nucleating agents, clarifying agents, and combinations thereof. As utilized herein, the term "nucleating agent" is used to refer to additives that form nuclei or provide sites for the formation and/or growth of crystals in a polymer as it solidifies from a molten state. If present, the nucleating agent in the polymer composition can be any suitable nucleating agent. Suitable nucleating agents include, but are not limited to, 2,2'-methylene-bis-(4,6-di-tert-butylphenyl) phosphate salts (e.g., sodium 2,2'-methylene-bis-(4,6-di-tert-butylphenyl) phosphate or aluminum 2,2'-methylene-bis-(4,6-di-tert-butylphenyl)phosphate), bicyclo[2.2.1]heptane-2,3-dicarboxylate salts (e.g., disodium bicyclo[2.2.1]heptane-2,3-dicarboxylate and calcium bicyclo[2.2.1]heptane-2,3-dicarboxylate), cyclohexane-1,2-dicarboxylate salts (e.g., calcium cyclohexane-1,2-dicarboxylate, monobasic aluminum cyclohexane-1,2-dicarboxylate, dilithium cyclohexane-1,2-dicarboxylate, strontium cyclohexane-1,2-dicarboxylate), and combinations thereof. For the bicyclo[2.2.1]heptane-2,3-dicarboxylate salts and the cyclohexane-1,2-dicarboxylate salts, the carboxylate moieties can be arranged in either the cis- or trans-configuration, with the cis-configuration being preferred.

If present in the polymer composition, the nucleating agent can be present in any suitable amount. As will be understood by those of ordinary skill in the art, the amount of nucleating agent suitable for use in the polymer composition will depend upon several factors, such as the composition of the nucleating agent and the desired properties of the polymer composition. For example, the nucleating agent can be present in the polymer composition in an amount of about 0.001 wt. % or more, about 0.0025 wt. % or more, about 0.01 wt. % or more, about 0.05 wt. % or more, about 0.075 wt. % or more, or about 0.1 wt. % or more, based on the total weight of the polymer composition. The nucleating agent can be present in the polymer composition in an amount of about 10 wt. % or less, about 5 wt. % or less, about 1 wt. % or less, about 0.5 wt. % or less, about 0.4 wt. % or less, or about 0.3 wt. % or less. In certain possibly preferred embodiments, the nucleating agent is present in the polymer composition in an amount of from about 0.01 to about 1 wt. %, about 0.05 to about 0.5 wt. %, about 0.075 to about 0.4 wt. %, or about 0.1 to about 0.3 wt. %, based on the total weight of the polymer composition.

If present in the composition, the clarifying agent can be any suitable clarifying agent. In certain possibly preferred embodiments, the clarifying agent is selected from the group consisting of trisamides and acetal compounds that are the condensation product of a polyhydric alcohol and an aromatic aldehyde. Suitable trisamide clarifying agents include, but are not limited to, amide derivatives of benzene-1,3,5-tricarboxylic acid, derivatives of N-(3,5-bis-formylaminophenyl)-formamide (e.g., N-[3,5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. In certain possibly preferred embodiments, the clarifying agent comprises an acetal compound that is the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the five remaining positions on the benzene ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a mono-acetal, di-acetal, or tri-acetal compound (i.e., a compound containing one, two, or three acetal groups, respectively).

In certain possibly preferred embodiments, the clarifying agent comprises an acetal compound conforming to the structure of Formula (I) below:

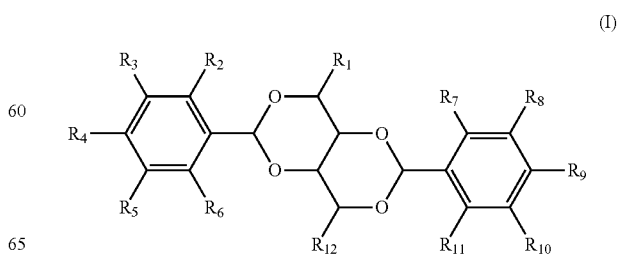

In the structure of Formula (I), $R_1$ is selected from the group consisting of hydrogen, alkyl groups, alkenyl groups, hydroxyalkyl groups, alkoxy groups, and alkyl halide groups. $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, and halogens. $R_{12}$ is a hydroxyalkyl group selected from the group consisting of —$CH_2OH$ and —$CHOHCH_2OH$. In certain embodiments, $R_1$ is selected from the group consisting of alkyl groups and alkenyl groups; $R_2$, $R_3$, $R_5$, $R_6$, $R_7$, $R_8$, $R_{10}$, and $R_{11}$ are each hydrogen; $R_{12}$ is —$CHOHCH_2OH$; and $R_4$ and $R_9$ are selected from the group consisting of alkyl groups and alkoxy groups. In certain more specific embodiments, $R_1$ is an alkyl group (preferably n-propyl); $R_2$, $R_3$, $R_5$, $R_6$, $R_7$, $R_8$, $R_{10}$, and $R_{11}$ are each hydrogen; $R_{12}$ is —$CHOHCH_2OH$; and $R_4$ and $R_9$ are each an alkyl group (preferably n-propyl). In certain other embodiments, $R_1$, $R_2$, $R_5$, $R_6$, $R_7$, $R_8$, and $R_{11}$ are each hydrogen; $R_{12}$ is —$CHOHCH_2OH$; and $R_3$, $R_4$, $R_9$, and $R_{10}$ are each alkyl groups (preferably methyl groups). In certain other embodiments, $R_1$, $R_2$, $R_5$, $R_6$, $R_7$, $R_8$, and $R_{11}$ are each hydrogen; $R_{12}$ is —$CHOHCH_2OH$; and $R_3$, $R_4$, $R_9$, and $R_{10}$ are each halogens (preferably chlorine atoms).

If present in the composition, the clarifying agent can be present in any suitable amount. As will be understood by those of ordinary skill in the art, the amount of clarifying agent suitable for use in the polymer composition will depend upon several factors, such as the composition of the clarifying agent and the desired optical properties of the polymer composition. For example, the clarifying agent can be present in the polymer composition in an amount of about 0.001 wt. % or more, about 0.0025 wt. % or more, about 0.01 wt. % or more, about 0.05 wt. % or more, about 0.075 wt. % or more, or about 0.1 wt. % or more, based on the total weight of the polymer composition. The clarifying agent can be present in the polymer composition in an amount of about 10 wt. % or less, about 5 wt. % or less, about 1 wt. % or less, about 0.7 wt. % or less, about 0.6 wt. % or less, or about 0.5 wt. % or less. In certain possibly preferred embodiments, the clarifying agent is present in the polymer composition in an amount of from about 0.01 to about 1 wt. %, about 0.05 to about 0.7 wt. %, about 0.075 to about 0.6 wt. %, or about 0.1 to about 0.5 wt. %, based on the total weight of the polymer composition. Thus, in certain possibly preferred embodiments, such as when the clarifying agent comprises an acetal compound conforming to the structure of Formula (I) in which $R_1$ is an alkyl group (e.g., n-propyl), $R_2$, $R_3$, $R_5$, $R_6$, $R_7$, $R_8$, $R_{10}$, and $R_{11}$ are each hydrogen, $R_{12}$ is —$CHOHCH_2OH$, and $R_4$ and $R_9$ are each an alkyl group (e.g., n-propyl), the clarifying agent can be present in the polymer composition in an amount of from about 0.1 wt. % to about 0.5 wt. % (e.g., about 0.15 wt. % to about 0.45 wt. %). In certain other possibly preferred embodiments, such as when the clarifying agent comprises an acetal compound conforming to the structure of Formula (I) in which $R_1$, $R_2$, $R_5$, $R_6$, $R_7$, $R_8$, and $R_{11}$ are each hydrogen; $R_{12}$ is —$CHOHCH_2OH$; and $R_3$, $R_4$, $R_9$, and $R_{10}$ are each alkyl groups (e.g., methyl groups), the clarifying agent can be present in the polymer composition in an amount of from about 0.1 wt. % to about 0.3 wt. % (e.g., about 0.15 wt. % to about 0.25 wt. %).

The fluoropolymer present in the polymer composition can be any suitable fluoropolymer (e.g., fluoroplastic or fluoroelastomer). Suitable fluoropolymers include, but are not limited to, polymers made from at least one monomer selected from the group consisting of vinylidene fluoride, hexafluoropropylene, chlorotrifluoroethylene, tetrafluoroethylene, perfluoro(alkyl vinyl ether), and combinations thereof. In certain possibly preferred embodiments, the fluoropolymer is a polymer selected from the group consisting of (i) copolymers of vinylidene fluoride and a comonomer selected from the group consisting of hexafluoropropylene, chlorotrifluoroethylene, 1-hydropentafluoropropylene, and 2-hydropentafluoropropylene; (ii) terpolymers of vinylidene fluoride, tetrafluoroethylene, and a comonomer selected from the group consisting hexafluoropropylene, 1-hydropentafluoropropylene, and 2-hydropentafluoropropylene; (iii) copolymers of tetrafluoroethylene and propylene; (iv) copolymers of tetrafluoroethylene, propylene, and vinylidene fluoride; and (v) combinations of two or more of (i)-(iv). In certain more specific possibly preferred embodiments, the fluoropolymer is a terpolymer of vinylidene fluoride, tetrafluoroethylene, and hexafluoropropylene.

The fluoropolymers suitable for use in the polymer composition can have any suitable molecular weight. However, in certain possibly preferred embodiments, the fluoropolymer has a relatively high molecular weight. While not wishing to be bound to any particular theory, it is believed that fluoropolymers having a relatively high molecular weight are particularly well-suited for use in the polymer composition of the invention due, at least in part, to the ability of such fluoropolymers to form and maintain coatings on the working surfaces of the equipment used to process the polymer composition. It is further believed that the coating formed on these working surfaces helps to improve the appearance of a molded article made from the polymer composition (e.g., improve the gloss) by preventing imperfections in these working surfaces from creating imperfections in the surfaces of the molded article or at least reducing the extent of the imperfections formed in the molded article.

As will be understood by those of ordinary skill in the art, the molecular weight of a polymer, including a fluoropolymer such as that used in the polymer composition of the invention, can be measured and expressed in many different ways, though measurements based on correlations between average molecular weight and one or more physical properties of the polymer are commonly used due to the complexity of measuring the molecular weight of the polymer chains in the polymer system. One such measurement is based on the correlation between average molecular weight and the rate of flow of the molten polymer (e.g., melt flow index (MFI)). Another such measurement is based on the correlation between average molecular weight and the shearing torque resisting rotation of a cylindrical metal disk or rotor embedded in the polymer (i.e., Mooney viscosity).

The fluoropolymers suitable for use in the polymer composition can have any suitable melt flow index (MFI). In certain possibly preferred embodiments, the fluoropolymer has an MFI of about 2 g/10 minutes or more, about 3 g/10 minutes or more, about 4 g/10 minutes or more, or about 5 g/10 minutes or more as measured in accordance with ASTM D1238-04c at 265° C. using a 5 kg weight. In certain possibly preferred embodiments, the fluoropolymer has an MFI of from about 2 to about 50 g/10 minutes, or about 3 to about 40 g/10 minutes, or about 4 to about 30 g/10 minutes as measured in accordance with ASTM D1238-04c at 265° C. using a 5 kg weight. In certain possibly more preferred embodiments, the fluoropolymer has an MFI of from about 5 to about 25 g/10 minutes as measured in accordance with ASTM D1238-04c at 265° C. using a 5 kg weight.

The fluoropolymers suitable for use in the polymer composition can have any suitable Mooney viscosity. In certain possibly preferred embodiments, the Mooney viscosity of the fluoropolymer is about 25 or more or about 28 or more, as measured in accordance with ASTM Standard D1646-07 at 121° C., large rotor, condition ML 1+10 minutes. In certain possibly preferred embodiments, the Mooney viscosity of the fluoropolymer is about 80 or less, about 70 or less, about 60 or less, about 50 or less, or about 40 or less (e.g., about 38 or less), as measured in accordance with ASTM Standard D1646-07 at 121° C., large rotor, condition ML 1+10 minutes. Thus, in certain possibly preferred embodiments, the Mooney viscosity of the fluoropolymer is about 25 to about 80, about 25 to about 70, about 25 to about 60, about 25 to about 50, or about 25 to about 40 (e.g., about 28 to about 38), as measured in accordance with ASTM Standard D1646-07 at 121° C., large rotor, condition ML 1+10 minutes.

The fluoropolymers suitable for use in the polymer composition include multimodal fluoropolymers. As utilized herein, the term "multimodal" is used to refer to a fluoropolymer that has at least two components of discrete and different molecular weights (e.g., discrete and different average molecular weights). Suitable multimodal fluoropolymer are described, for example, in International Patent Application Publication No. WO 2000/69967. In such multimodal fluoropolymers, each of the components may be amorphous or semi-crystalline, or one component may be amorphous and another component semi-crystalline.

The fluoropolymer can be present in the polymer composition of the invention in any suitable amount. In order to avoid or reduce deleterious effects on the optical properties of articles produced using the polymer composition of the invention, the inventors have found that the fluoropolymer typically should be present in the polymer composition in an amount that is relatively low. In certain possibly preferred embodiments, the fluoropolymer is present in the polymer composition in an amount of about 1,000 ppm or less, about 750 ppm or less, about 500 ppm or less, or about 250 ppm or less (e.g., about 200 ppm or less), based on the total weight of the polymer composition. In certain possibly preferred embodiments, the fluoropolymer can be present in the polymer composition in an amount such that the ratio of the amount of polymer additive present in the polymer composition to the amount of fluoropolymer present in the polymer composition is from about 4:1 to about 100:1, about 8:1 to about 100:1, about 10:1 to about 100:1, or about 20:1 to about 100:1, based on the total weight of the polymer additive and the fluoropolymer present in the polymer composition.

Many commercially-available fluoropolymers sold as polymer processing aids contain small amounts of at least one interfacial agent, such as a polyalkylene oxide (e.g., poly(ethylene glycol) or poly(ethylene oxide)), which is thought to improve the performance of the polymer processing aid by wetting the surface of the fluoropolymer particles in the polymer processing aid. However, despite the benefits typically associated with the use of interfacial agents, such as poly(ethylene glycol), it is believed that such interfacial agents can actually detract from the favorable optical properties of a molded article produced using a polymer composition of the invention. Accordingly, in certain possibly preferred embodiments, the polymer composition of the invention is substantially free of poly(ethylene glycol) or substantially free of any interfacial agent. More specifically, in certain possibly preferred embodiments, the polymer composition contains less than 100 ppm of poly(ethylene glycol), less than 50 ppm of poly(ethylene glycol), less than 25 ppm of poly(ethylene glycol), less than 10 ppm of poly(ethylene glycol), or less than 5 ppm of poly(ethylene glycol).

The polymer composition can have any suitable apparent melt viscosity. The apparent melt viscosity of the polymer composition can be measured using any suitable method. For example, the apparent melt viscosity can be determining using the test method described in ASTM Test Method D3835-08 entitled "Standard Test Method for Determination of Properties of Polymeric Materials by Means of a Capillary Rheometer." While this test method provides that 230° C. is the testing temperature typically employed in testing polypropylene compositions, the applicant believes that 190° C. is a more suitable temperature since it better approximates the lower processing temperatures that the applicant seeks to enable with the disclosed composition and method. Thus, the apparent melt viscosities for the polymer compositions listed herein preferably are determined using the above-referenced test method at a temperature of 190° C. The apparent melt viscosity of the polymer composition can be measured at any suitable apparent shear rates. It is believed that it is useful to measure the apparent melt viscosity at two or more different apparent shear rates that approximate the shear conditions that the polymer composition experiences during processing. For example, it is believed that apparent shear rates of 50 s$^{-1}$, 20 s$^{-1}$, and 15 s$^{-1}$ approximate the relatively mild shear conditions experienced by the polymer composition, for example, as the parison is blown and expands towards the interior surface of a mold cavity. On the other hand, it is believed that an apparent shear rate of 1,000 s$^{-1}$ approximates the relatively high shear conditions experienced by the polymer composition as, for example, it exits the die orifice. When measuring the apparent melt viscosity of the polymer composition, the capillary rheometer preferably is equipped with a 1.00 mm diameter capillary die with a length to diameter ratio of 30:1. Further, the polymer composition preferably is allowed to remain in the capillary rheometer for a dwell time of six (6) minutes prior to beginning the test. Preferably, the measurement of apparent melt viscosity is repeated at least three times and the values for such measurements are averaged. Lastly, the apparent melt viscosity of the polymer composition preferably is determined after the polymer, polymer additive, fluoropolymer, and optional components (e.g., peroxide) have been melt processed (e.g., passed through an extruder).

In a preferred embodiment, the polymer composition has an apparent melt viscosity of about 200 Pa·s or less at an apparent shear rate of 1,000 s$^{-1}$ and a temperature of 190° C. In another preferred embodiment, the polymer composition has an apparent melt viscosity of 2,550 Pa·s or less at an apparent shear rate of 20 s$^{-1}$ and a temperature of 190° C. In another preferred embodiment, the polymer composition has an apparent melt viscosity of 1,500 Pa·s or less at an apparent shear rate of 50 s$^{-1}$ and a temperature of 190° C. In yet another preferred embodiment, the polymer composition has an apparent melt viscosity of 3000 Pa·s or less at an apparent shear rate of 15 s$^{-1}$ and a temperature of 190° C. In a particularly preferred embodiment, the polymer composition has (i) an apparent melt viscosity of about 200 Pa·s or less at an apparent shear rate of 1,000 s$^{-1}$ and a temperature of 190° C. and (ii) an apparent melt viscosity of 2,550 Pa·s or less at an apparent shear rate of 20 s$^{-1}$ and a temperature of 190° C. In another particularly preferred embodiment, the polymer composition has (i) an apparent melt viscosity of about 200 Pa·s or less at an apparent shear rate of 1,000 s$^{-1}$ and a temperature of 190° C., (ii) an apparent melt viscosity of 2,550 Pa·s or less at an apparent shear rate of 20 s$^{-1}$ and a temperature of 190° C., and (iii) an apparent melt viscosity of 1,500 Pa·s or less at an apparent shear rate of 50 s$^{-1}$ and a temperature of 190° C. In another particularly preferred embodiment, the polymer composition has (i) an apparent melt viscosity of about 200 Pa·s or less at an apparent shear rate of 1,000 s$^{-1}$ and a temperature of 190° C., (ii) an apparent melt viscosity of 2,550 Pa·s or less at an apparent shear rate of 20 s$^{-1}$ and a temperature of 190° C., and (iii) an apparent melt viscosity of 3000 Pa·s or less at an apparent shear rate of 15 s$^{-1}$ and a temperature of 190° C. In yet another particularly preferred embodiment, the polymer composition has (i) an apparent melt viscosity of about 200 Pa·s or less at an apparent shear rate of 1,000 s$^{-1}$ and a temperature of 190° C., (ii) an apparent melt viscosity of 2,550 Pa·s or less at an apparent shear rate of 20 s$^{-1}$ and a temperature of 190° C., (iii) an apparent melt viscosity of 1,500 Pa·s or less at an apparent shear rate of 50 s$^{-1}$ and a temperature of 190° C., and (iv) an apparent melt viscosity of 3000 Pa·s or less at an apparent shear rate of 15 s$^{-1}$ and a temperature of 190° C.

The values set forth above represent maximum values for the apparent melt viscosity of the polymer composition at several different apparent shear rates. In certain embodiments, the apparent melt viscosity of the polymer composition preferably does not fall below a certain minimum value, which value will depend upon the apparent shear rate. For example, in a preferred embodiment, the polymer composition has an apparent melt viscosity of about 50 Pa·s or more, more preferably about 100 Pa·s or more, at an apparent shear rate of 1,000 s$^{-1}$ and a temperature of 190° C. In another preferred embodiment, the polymer composition has an apparent melt viscosity of about 500 Pa·s or more, more preferably about 700 Pa·s or more, at an apparent shear rate of 50 s$^{-1}$ and a temperature of 190° C. In yet another preferred embodiment, the polymer composition has an apparent melt viscosity of about 500 Pa·s or more, more preferably about 800 Pa·s or more, at an apparent shear rate of 20 s$^{-1}$ and a temperature of 190° C. In yet another preferred embodiment, the polymer composition has an apparent melt viscosity of about 800 Pa·s or more, more preferably about 1,000 Pa·s or more, at an apparent shear rate of 15 s$^{-1}$ and a temperature of 190° C.

In a series of preferred embodiments, the polymer composition preferably the polymer composition has (i) an apparent melt viscosity of about 50 Pa·s to about 200 Pa·s (e.g., about 100 Pa·s to about 200 Pa·s) at an apparent shear rate of 1,000 s$^{-1}$ and a temperature of 190° C. and (ii) an apparent melt viscosity of about 500 Pa·s to 2,550 Pa·s (e.g., about 800 Pa·s to 2,550 Pa·s) at an apparent shear rate of 20 s$^{-1}$ and a temperature of 190° C. In another particularly preferred embodiment, the polymer composition has (i) an apparent melt viscosity of about 50 Pa·s to about 200 Pa·s (e.g., about 100 Pa·s to about 200 Pa·s) at an apparent shear rate of 1,000 s$^{-1}$ and a temperature of 190° C., (ii) an apparent melt viscosity of about 500 Pa·s to 2,550 Pa·s (e.g., about 800 Pa·s to 2,550 Pa·s) at an apparent shear rate of 20 s$^{-1}$ and a temperature of 190° C., and (iii) an apparent melt viscosity of about 500 Pa·s to 1,500 Pa·s (e.g., about 700 Pa·s to 1,500 Pa·s) at an apparent shear rate of 50 s$^{-1}$ and a temperature of 190° C. In another particularly preferred embodiment, the polymer composition has (i) an apparent melt viscosity of about 50 Pa·s to about 200 Pa·s (e.g., about 100 Pa·s to about 200 Pa·s) at an apparent shear rate of 1,000 s$^{-1}$ and a temperature of 190° C., (ii) an apparent melt viscosity of about 500 Pa·s to 2,550 Pa·s (e.g., about 800 Pa·s to 2,550 Pa·s) at an apparent shear rate of 20 s$^{-1}$ and a temperature of 190° C., and (iii) an apparent melt viscosity of about 800 Pa·s to 3,000 Pa·s (e.g., about 1,000 Pa·s to 3,000 Pa·s) at an apparent shear rate of 15 s$^{-1}$ and a temperature of 190° C. In yet another particularly preferred embodiment, the polymer composition has (i) an apparent melt viscosity of about 50 Pa·s to about 200 Pa·s (e.g., about 100 Pa·s to about 200 Pa·s) at an apparent shear rate of 1,000 s$^{-1}$ and a temperature of 190° C., (ii) an apparent melt viscosity of about 500 Pa·s to 2,550 Pa·s (e.g., about 800 Pa·s to 2,550 Pa·s) at an apparent shear rate of 20 s$^{-1}$ and a temperature of 190° C., (iii) an apparent melt viscosity of about 500 Pa·s to 1,500 Pa·s (e.g., about 700 Pa·s to 1,500 Pa·s) at an apparent shear rate of 50 s$^{-1}$ and a temperature of 190° C., and (iv) an apparent melt viscosity of about 800 Pa·s to 3,000 Pa·s (e.g., about 1,000 Pa·s to 3,000 Pa·s) at an apparent shear rate of 15 s$^{-1}$ and a temperature of 190° C.

The polymer (e.g., polypropylene polymer) used in the composition can be a polymer that has been manufactured to possess the apparent melt viscosity, Melt Flow Rate, and/or Flow Rate Ratio described herein for the polymer composition. For example, polypropylene polymers suitable for use in the composition include those manufactured in such a manner that the polymer sold by the manufacturer possesses one or more of the apparent melt viscosity values described herein for the polymer composition. Alternatively, a polymer (e.g., a polypropylene polymer) that does not possess the desired characteristics can be modified through treatment with one or more additives, by mechanical processing, or by mixing the polymer with one or more additional polymers in order to achieve the desired apparent melt viscosity, Melt Flow Rate, and/or Flow Rate Ratio. For example, the polymer can be combined with an organic peroxide or a vis-breaking agent and then melt processed (e.g., extruded) in order to modify one or more characteristics of the polymer. Examples of organic peroxides suitable for such use include but are not limited to: 2,5-dimethyl-2,5-di(tert-butylperoxy)hexane, 2,5-dimethyl-2,5-di(tert-butyl peroxy)hexyne-3,3,6,6,9,9-pentamethyl-3-(ethyl acetate)-1,2,4,5-tetraoxy cyclononane, tert-butyl hydroperoxide, hydrogen peroxide, dicumyl peroxide, tert-butyl peroxy isopropyl carbonate, di-tert-butyl peroxide, p-chlorobenzoyl peroxide, dibenzoyl diperoxide, tert-butyl cumyl peroxide, tert-butyl hydroxyethyl peroxide, di-tert-amyl peroxide, 2,5-dimethylhexene-2,5-diperisononanoate, acetylcyclohexanesulphonyl peroxide, diisopropyl peroxydicarbonate, tert-amyl perneodecanoate, tert-butyl-perneodecanoate, tert-butylperpivalate, tert-amylperpivalate, bis(2,4-dichlorobenzoyl)peroxide, diisononanoyl peroxide, didecanoyl peroxide, dioctanoyl peroxide, dilauroyl peroxide, bis(2-methylbenzoyl)peroxide, disuccinoyl peroxide, diacetyl peroxide, dibenzoyl peroxide, tert-butyl per-2-ethylhexanoate, bis(4-chlorobenzoyl)peroxide, tert-butyl perisobutyrate, tert-butyl permaleate, 1,1-bis(tert-butylperoxy)-3,5,5-trimethylcyclo-hexane, 1,1-bis(tert-butylperoxy)cyclohexane, tert-butyl peroxyisopropyl carbonate, tert-butyl perisononaoate, 2,5-dimethylhexane 2,5-dibenzoate, tert-butyl peracetate, tert-amyl perbenzoate, tert-butyl perbenzoate, 2,2-bis(tert-butylperoxy)butane, 2,2-bis(tert-butylperoxy)propane, dicumyl peroxide, 2,5-dimethylhexane 2,5-di-tert-butylperoxid, 3-tert-butylperoxy-3-phenyl phthalide, di-tert-amyl peroxide, α,α'-bis(tert-butylperoxyisopropyl)benzene, 3,5-bis(tert-butylperoxy)-3,5-dimethyl-1,2-dioxolane, di-tert-butyl peroxide, 2,5-dimethylhexyne 2,5-di-tert-butyl peroxide, 3,3,6,6,9,9-hexamethyl-1,2,4,5-tetraoxacyclononane, p-menthane hydroperoxide, pinane hydroperoxide, diisopropylbenzene mono-α-hydroperoxide, cumene hydroperoxide and tert-butyl hydroperoxide.

When used, any suitable amount of organic peroxide or vis-breaking agent can be added to the polymer composition prior to melt processing. As will be understood by those skilled in the art, the organic peroxide or vis-breaking agent typically degrades during melt processing (e.g., extrusion) and, therefore, the organic peroxide or vis-breaking agent typically is no longer present in detectable amounts in the polymer composition after melt processing. The suitable amount of organic peroxide added prior to melt processing will depend upon several factors, such as the particular polymer that is used in the composition, the starting properties of the polymer, and the desired change in the properties of the polymer. In a preferred embodiment, the organic peroxide can be present in the polymer composition (prior to melt processing) in an amount of about 10 ppm or more, about 50 ppm or more, or about 100 ppm or more, based on the total weight of the polymer composition prior to melt processing. In another preferred embodiment, the organic peroxide can be present in the polymer composition (prior to melt processing) in an amount of about 1 wt. % (10,000 ppm) or less, about 0.5 wt. % (5,000 ppm) or less, about 0.4 wt. % (4,000 ppm) or less, about 0.3 wt. % (3,000 ppm) or less, about 0.2 wt. % (2,000 ppm) or less, or about 0.1 wt. % (1,000 ppm) or less, about 0.05 wt. % (about 500 ppm) or less based on the total weight of the polymer composition prior to melt processing. Thus, in a series of preferred embodiments, the organic peroxide can be present in the polymer composition (prior to melt processing) in an amount of about 10 to about 5,000 ppm, about 50 to about 3,000 ppm, about 50 to about 2,000 ppm, or about 100 to about 1,000 ppm, based on the total weight of the polymer composition prior to melt processing.

As noted above, a polymer that does not initially possess the desired apparent melt viscosity, Melt Flow Rate, and/or Flow Rate Ratio can be mechanically processed in such a way as to modify any of these properties to be within the desired parameters. For example, the polymer can be processed under relatively vigorous, high shear conditions (e.g., using a twin screw compounding extruder operating at a high screw speed, such as 250 rpm or more). It is believed that such high shear conditions can modify the melt characteristics of the polymer into the desired range of apparent melt viscosities, Melt Flow Rates, and/or Flow Rate Ratios described herein.

As noted above, a polymer that does not initially possess the desired apparent melt viscosity, Melt Flow Rate, and/or Flow Rate Ratio can be combined with one or more additional polymers so that the properties of the resulting mixture fall within the desired parameters. For example, a polymer that has a relatively high apparent melt viscosity (i.e., an apparent melt viscosity that is above the maximum recited for the ranges above) can be combined with a second polymer having a lower apparent melt viscosity in order to achieve the desired properties. The amount of additional polymers necessary for such use may depend upon several factors, such as the initial properties of the first polymer (e.g., the apparent melt viscosity of the first polymer), the properties of the additional polymer(s) to be combined with the first polymer (e.g., the apparent melt viscosity of the second polymer), and the desired properties of the resulting mixture. In one particularly preferred embodiment, a polymer that does not initially possess the desired apparent melt viscosity, Melt Flow Rate, and/or Flow Rate Ratio can be combined with a masterbatch composition comprising a second polymer, the polymer additive, and the fluoropolymer. The second polymer contained in the masterbatch acts as the carrier for the other components of the masterbatch, but also functions as the second polymer that modifies the apparent melt viscosity, Melt Flow Rate, and/or Flow Rate Ratio of the mixture so that it falls within the desired range. In such an embodiment, the masterbatch composition need not comprise only one polymer. For example, the masterbatch can comprise a combination of two or more different polymers that provide the desired properties for the masterbatch composition.

The polymer composition can have any suitable Melt Flow Rate. The Melt Flow Rate of the polymer composition can be determined by any suitable method. For example, the Melt Flow Rate of the polymer composition can be determined using Procedure B in ASTM Standard D1238-10 entitled "Standard Test Method for Melt Flow Rates of Thermoplastics by Extrusion Plastometer." The Melt Flow Rate of the polymer composition preferably is measured using the aforementioned standard test method. Preferably, the polymer composition has a Melt Flow Rate of 2.0 g/10 min or more. More preferably, the polymer composition has a Melt Flow Rate of about 2.1 g/10 min or more, about 2.2 g/10 min or more, about 2.3 g/10 min or more, about 2.4 g/10 min or more, or about 2.5 g/10 min or more. The polymer composition has a Melt Flow Rate of about 10 g/10 min or less, more preferably about 8 g/10 min or less. As in the measurement of the apparent melt viscosity, the Melt Flow Rate of the polymer composition preferably is determined after the polymer, polymer additive, fluoropolymer, and optional components (e.g., peroxide) have been melt processed (e.g., passed through an extruder).

As will be understood by those of ordinary skill in the art, the polymer will contain a population of discrete polymer chains, and those polymer chains will have varying lengths and molar masses. The statistical distribution of the lengths/molar masses of the polymer chains contained in the polymer is generally referred to as the molar mass distribution or molecular weight distribution. The polymers used in the compositions described herein can have any suitable molar mass distribution. For example, the polymer can have a molar mass distribution exhibiting a single mode or the molar mass distribution can exhibit a plurality of modes (e.g., bimodal, trimodal, etc.). The breadth of the molar mass distribution of a polymer can be expressed using the polydispersity index. The polydispersity index is calculated by measuring the number average molar mass and the mass average molar mass (i.e., weight average molar mass) of the polymer, and then dividing the mass average molar mass of the polymer by the number average molar mass of the polymer. The result is a dimensionless unit that quantifies the breadth of the molar mass distribution, with higher values indicating greater breadth in the molar mass distribution. The breadth of the molar mass distribution can also be indirectly quantified by measuring and comparing the Melt Flow Rate of the polymer (or a composition containing the polymer) under different conditions to yield a Flow Rate Ratio (FRR). This method is described, for example, in Procedure D of ASTM Standard D1238 entitled "Standard Test Method for Melt Flow Rates of Thermoplastics by Extrusion Plastometer." Preferably, the FRR is calculated using the Melt Flow Rate measured using the 10 kg weight specified in the standard ($MFR_{10}$) and the Melt Flow Rate measured using the 2 kg weight specified in the standard ($MFR_2$). The polymer composition described herein can have any suitable FRR. Preferably, the polymer composition has a FRR ($MFR_{10}/MFR_2$) of about 20 or less. More preferably, the polymer composition has a FRR (MFR$_{10}$/MFR$_2$) of about 19 or less or about 18 or less. As in measuring the apparent melt viscosity and the Melt Flow Rate, the Flow Rate Ratio of the polymer composition preferably is determined after the polymer, polymer additive, fluoropolymer, and optional components (e.g., peroxide) have been melt processed (e.g., passed through an extruder).

As noted above, the invention also provides a molded thermoplastic article comprising at least one wall defining a cavity, the wall having an opening therein permitting access to the cavity. The wall is formed from a polymer composition that comprises a polymer, a polymer additive selected from the group consisting of nucleating agents, clarifying agents, and combinations thereof, and a fluoropolymer, such as any of the embodiments of the polymer composition described above.

As noted above, the polymer composition of the invention is believed to be particularly well-suited for use in producing molded articles exhibiting desirable optical properties, such as high gloss (both inside gloss and outside gloss) and low haze. In particular, it is believed that molded articles produced using the polymer composition of the invention can exhibit gloss values that are 5, 10, 15, or even 20 gloss units higher than a molded article produced using a comparable polymer composition that does not contain each of the components described in the present application, when the gloss of the molded article is measured in accordance with ASTM Standard D523 at an angle of 60°.

The molded thermoplastic article of the invention can be formed by any suitable method. However, the polymer composition of the invention is believed to be particularly well-suited for use in extrusion blow molding processes. Thus, in a third embodiment, the invention provides a method generally comprising the steps of providing an apparatus comprising a die and a mold cavity, providing a polymer composition, heating the polymer composition to a temperature sufficient to plasticize (melt) the polymer composition so that it may be extruded through the die of the apparatus, extruding the plasticized (molten) polymer composition through the die to form a parison, capturing the parison in the mold cavity, blowing a pressurized fluid into the parison under sufficient pressure to inflate the parison so that it conforms to the interior surface of the mold cavity and produces a molded article, allowing the molded article to cool to a temperature at which the polymer composition at least partially solidifies so that the molded article retains its shape, and removing the molded article from the mold cavity. The polymer composition used in the method comprises a polymer, a polymer additive selected from the group consisting of nucleating agents, clarifying agents, and combinations thereof, and a fluoropolymer, such as any of the embodiments of the polymer composition described above.

The apparatus used in practicing the method of the invention can by any suitable extrusion blow molding apparatus. Suitable extrusion blow molding apparatus include continuous extrusion blow molding apparatus, such as rotary wheel extrusion blow molding apparatus and shuttle extrusion blow molding apparatus, and intermittent extrusion blow molding apparatus, such as reciprocating screw extrusion blow molding apparatus and accumulator head extrusion blow molding apparatus. As noted above, the apparatus includes a die through which the plasticized (molten) polymer composition is extruded to form a parison. The apparatus also includes a mold having a mold cavity. The mold cavity or the interior surfaces of the mold cavity defines the shape of the molded article to be produced by the apparatus. More specifically, the interior surfaces of the mold cavity define the exterior surfaces of the molded article produced by the apparatus.

In certain possibly preferred embodiments, the apparatus used in the practice of the method can first be prepped for the production of molded articles by running a polymer composition containing a fluoropolymer (e.g., a masterbatch containing a fluoropolymer) through the working surfaces of the apparatus, such as the die and mold. More specifically, if a masterbatch is used, the masterbatch is let-down into a carrier polymer, mixed, and the resulting mixture is run through the apparatus. Typically, the masterbatch is let-down into the carrier polymer at a ratio or rate that produces a mixture containing an amount of fluoropolymer that is greater than the amount of fluoropolymer that is present in the polymer composition used to produce the molded articles. While not wishing to be bound to any particular theory, it is believed that running this mixture, which contains a relatively high amount of fluoropolymer, through the apparatus helps to thoroughly coat the working surfaces of the apparatus with the fluoropolymer. It is also believed that this coating, at least in part, helps to improve the optical properties of the molded article by eliminating or at least reducing imperfections in the molded article caused by imperfections or irregularities in the working surfaces (e.g., die and mold cavity) of the apparatus. The fluoropolymer and carrier polymer used in the above-described procedure can be any suitable fluoropolymer and carrier polymer, such as the fluoropolymers and thermoplastic polymers described above. Furthermore, the fluoropolymer and carrier polymer can be the same as those contained in the polymer composition used to produce the molded articles, or the fluoropolymer and/or the carrier polymer can be different from those contained in the polymer composition used to produce the molded articles.

When used prior to the production of molded articles in accordance with the method of the invention, the polymer composition described in the preceding paragraph (e.g., masterbatch composition) can be run through the apparatus for any suitable amount of time. Typically, the composition (e.g., masterbatch composition) is run through the apparatus for an amount of time sufficient to work the composition (e.g., masterbatch composition) through the internal portions of the apparatus (e.g., extruder screw) and begin to coat the working surfaces of the apparatus (e.g., about 5 minutes or more, about 10 minutes or more, or about 15 minutes or more). After the composition (e.g., masterbatch composition) has been run through the apparatus for the desired length of time, the apparatus can be disassembled so that any char and/or molten polymer can be removed from the working surfaces of the apparatus (e.g., the die). After these surfaces have been cleaned, the apparatus can be reassembled, and the composition (e.g., masterbatch and carrier polymer mixture) can be run through the apparatus for an additional time, if desired (e.g., an additional 60 minutes or more). Once the desired amount of the composition (e.g., masterbatch and carrier polymer mixture) have been run though the apparatus, the apparatus can be purged by running a carrier polymer (i.e., carrier polymer without masterbatch) through the apparatus for an amount of time sufficient to purge the masterbatch and carrier polymer mixture from the apparatus (e.g., about 15 minutes or more). The carrier polymer used in this purging step typically is the same as the carrier polymer mixed with the masterbatch composition, but it is not necessary or required that they be the same.

If the above-described preparation procedure is followed, the polymer composition comprising the polymer additive and fluoropolymer is fed into the apparatus once the apparatus has been purged for the desired amount of time. As will be understood by those of ordinary skill in the art, the step of heating the polymer composition to a temperature sufficient to plasticize (melt) the composition typically is achieved, at least in part, by the friction generated by the extruder screw used to feed the polymer composition to the die of the apparatus. This frictional heating typically is supplemented using heaters, which allows the polymer composition to be heated under more controlled conditions and to a temperature at which the polymer composition is more easily extruded through the die.

Once the polymer composition has been heated to the temperature, the polymer composition is extruded through the die of the apparatus to form a parison. The resulting parison is then captured in the mold cavity of the apparatus. The mold typically contains a single opening that allows access to the mold cavity. The parison is captured in the mold in such a way that the open end of the parison is aligned with the opening in the mold. Once the parison has been captured in the mold, a pressurized fluid (e.g., air) is blown into the parison under sufficient pressure to inflate the parison so that it conforms to the interior surface of the mold cavity and forms the desired molded article. Once the parison has been blown to form the desired molded article, the article is held in the mold for an amount of time sufficient for the polymer to solidify to such a degree that the article maintains its shape when removed from the mold. The mold of the apparatus typically is cooled so that this cooling can be more rapidly achieved and the cycle time lowered.

The following examples further illustrate the subject matter described above but, of course, should not be construed as in any way limiting the scope thereof.

Example 1

This example demonstrates a method for producing a thermoplastic article in accordance with the invention. Six five-kilogram batches of polypropylene random copolymer samples (samples 1A-1F) were compounded in accordance with the formulations set forth in Table 1 below. Five kilograms of a polymer composition (Polymer Composition A) were made in accordance with the formulation set forth in Table 2 below.

The fluoropolymer used in this example is Dynamar™ FX 5911 polymer processing additive from 3M. The fluoropolymer is believed to be a terpolymer of vinylidene fluoride, tetrafluoroethylene, and hexafluoropropylene, which exhibits a melt from rate of approximately 10.8 g/10 minutes as measured in accordance with ASTM D1238-04c at 265° C. using a 5 kg weight. Dynamar™ FX 5911 is also believed to be substantially free of interfacial agents. The peroxide used in this example is Trigonox® 101, a 2,5-Dimethyl-2,5-di(tert-butylperoxy)hexane from Akzo Nobel. The polypropylene random copolymer used for the Samples 1A-1F and Polymer Composition A is Tipplen Re 605 from MOL Petrochemicals Co. Ltd, which exhibits a melt flow rate of approximately 2 g/10 minutes as measured in accordance with ISO1133 at 230° C. using a 2.16 kg weight.

TABLE 1

Formulations for Sample 1A-1F.

| | Component | Amount |
|---|---|---|
| | Polypropylene random copolymer | 4979 g |
| | Acid Scavenger (Calcium Stearate) | 4.0 g |
| | Primary Antioxidant (Irganox ® 1010) | 2.5 g |
| | Secondary Antioxidant (Irgafos ® 168) | 5.0 g |
| Clarifying agent (Millad ® NX8000K) | 1A | 9.5 g |
| | 1B | 9.5 g |
| | 1C | 9.5 g |
| | 1D | 9.5 g |
| | 1E | 9.5 g |
| | 1F | 9.5 g |
| Fluoropolymer (Dynamar ™ FX5911) | 1A | 0 g |
| | 1B | 0 g |
| | 1C | 0 g |
| | 1D | 0.5 g |
| | 1E | 0.5 g |
| | 1F | 0.5 g |
| Polymer Composition A | 1A | 0 |
| | 1B | 50 g |
| | 1C | 125 g |
| | 1D | 0 |
| | 1E | 125 g |
| | 1F | 200 g |

TABLE 2

Formulation for Polymer Composition A.

| Component | Amount |
|---|---|
| Polypropylene random copolymer (Tipplen R ® 605) | 5000.0 g |
| Acid Scavenger (Calcium Stearate) | 4.0 g |
| Primary Antioxidant (Irganox ® 1010) | 2.5 g |
| Secondary Antioxidant (Irgafos ® 168) | 5.0 g |
| Zebra-flow T028 (10% Trigonox ® 101 in PP from Zebra-chem GmbH) | 50.0 g |

Polymer Composition A was compounded by blending the components in a Kenwood KM800 low intensity mixer for an estimated time of 5 minutes at dial setting 1. The sample was then melt compounded on a Leistritz Micro27 GL-40D twin screw compounding extruder with two 27 mm diameter screws and length/diameter ratio of 40:1. The barrel temperature of the extruder was increased from approximately 200° C. to approximately 230° C., the throughput was set at 40 kg/h, and the screw speed was set at 450 rpm. The extrudate (in the form four strands) for each sample was cooled in a water bath and subsequently pelletized.

Each of the polypropylene random copolymer samples were compounded by blending the components in a Kenwood KM800 low intensity mixer for an estimated time of 5 minutes at dial setting 1. The mixtures were then melt compounded on a Leistritz Micro27 GL-40D twin screw compounding extruder with two 27 mm diameter screws and length/diameter ratio of 40:1. The barrel temperature of the extruder was increased from approximately 200° C. to approximately 230° C., the throughput was set at 40 kg/h, and the screw speed was set at 450 rpm. The extrudate (in the form four strands) for each sample was cooled in a water bath and subsequently pelletized.

The melt flow rate (MFR) of Samples 1A-1F were measured on pellets in accordance with ISO1133 at 230° C. using a 2.16 kg weight. The results are shown in Table 3 below.

The apparent melt viscosity of Sample 1A-1F were measured using a Goettfert Rheo-Tester 2000 capillary rheometer in accordance with ASTM D3835-08. The apparent melt viscosity was measured at a temperature of 190° C. (the sample was conditioned in the rheometer for a 6 minute dwell time prior to testing) at various apparent shear rates in the range of 10 to 1000 $s^{-1}$ using a 1.00 mm diameter capillary die with a length to diameter ratio of 30:1. The apparent melt viscosities of Sample 1 at various shear rates are shown in Table 3.

TABLE 3

Melt flow rate and viscosity of samples 1A-1F

| Sample | MFR (g/10 min) | Apparent melt viscosity (Pa·s) measured at selected apparent shear rate (below) | | | |
|---|---|---|---|---|---|
| | | 15 $s^{-1}$ | 20 $s^{-1}$ | 50 $s^{-1}$ | 1000 $s^{-1}$ |
| 1A | 2.1 | 3330 | 2860 | 1620 | 203 |
| 1B | 2.5 | 2890 | 2520 | 1540 | 197 |
| 1C | 2.8 | 2810 | 2440 | 1490 | 193 |
| 1D | 2.1 | 3220 | 2780 | 1600 | 202 |
| 1E | 2.5 | 2940 | 2510 | 1560 | 196 |
| 1F | 2.8 | 2730 | 2420 | 1440 | 189 |

Following the preparation sequence as noted above, each of the polypropylene random copolymer samples 1A-1F were blow molded into 300 mL shampoo bottles on a single-shuttle, single-station W. Müller extrusion blow-molding machine. The barrel temperature was increased from approximately 180° C. to approximately 190° C., with the extrusion head maintained at a temperature of approximately 180° C. The manifold temperature was maintained at approximately 190° C. The die temperature was set to 180° C. The molten polymer parison was extruded at approximately 190° C. melt temperature into a fine glass bead blasted blow mold that was maintained at a mold temperature of approximately 12° C. The cycle time was set at 12.2 seconds. The final polypropylene bottle weighed approximately 22 grams and measured 0.95 mm in thickness. The bottles produced were then tested as described below.

The percent haze and percent clarity for the side wall of the bottles was measured in accordance with ASTM Standard D1103-92 using a BYK-Gardner Haze-Guard Plus. The gloss of both the inside and outside of the bottle side wall was measured in accordance with ASTM Standard D523 using a BYK-Gardner micro-TRI-gloss at an angle of 60°. The measured percent haze, percent clarity and gloss values for the bottles are shown in Table 4 below.

TABLE 4

Optical Properties of bottles made from Samples 1A-1F.

| Sample | Haze (%) | Clarity (%) | Inside Gloss (Gloss units) | Outside Gloss (Gloss units) |
|---|---|---|---|---|
| 1A | 20 | 61 | 68 | 39 |
| 1B | 21 | 52 | 57 | 33 |
| 1C | 23 | 49 | 45 | 31 |
| 1D | 20 | 74 | 81 | 51 |
| 1E | 19 | 77 | 92 | 67 |
| 1F | 19 | 87 | 101 | 89 |

As can be seen from the data in Table 4, the samples possessing the desired apparent melt viscosity (e.g., Samples 1E and 1F) exhibited a desirable combination of low haze, high clarity, and high gloss (both inside and outside). Indeed, the outside gloss for Samples 1E and 1F was dramatically higher than the gloss for the other samples, such as Sample 1 D, which contained a similar combination of additives as Samples 1E and 1F but did not possess the desired apparent melt viscosity values. This improvement in gloss resulted in a bottle with significantly improved aesthetics.

Example 2

This example demonstrates a method for producing a thermoplastic article in accordance with the invention.

ISPLEN® RC530 polypropylene random copolymer was used in this example. The resin as received was labeled as sample 2A. The same resin was used to make Samples 2B-2D. All Samples 2A-2D contain approximately 2000 ppm of NX8000K clarifying agent and approximately 90 ppm of Dynamar™ FX5911 polymer processing aid.

Samples 2B-2D were melt compounded on a Leistritz Micro27 GL-40D twin screw compounding extruder with two 27 mm diameter screws and length/diameter ratio of 40:1. The barrel temperature of the extruder was set to approximately 230° C. along the entire barrel (flat temperature profile), the throughput was set at 30 kg/h, and the screw speed was set 265 rpm for Sample 2B, 415 rpm for Sample 2C, and 495 rpm for Sample 2D. The extrudate (in the form of four strands) for each sample was cooled in a water bath and subsequently pelletized.

The melt flow rate (MFR) of Samples 2A-2D were measured on pellets in accordance with ISO1133 at 230° C. using a 2.16 kg weight. The results are shown in Table 5 below.

The apparent melt viscosity of Sample 2A-2D were measured using a Goettfert Rheo-Tester 2000 capillary rheometer in accordance with ASTM D3835-08. The apparent melt viscosity was measured at a temperature of 190° C. (the sample was conditioned in the rheometer for a 6 minute dwell time prior to testing) at various apparent shear rates in the range of 10 to 1000 $s^{-1}$ using a 1.00 mm diameter capillary die with a length to diameter ratio of 30:1. The apparent melt viscosities of Sample 2A-D at various shear rates are shown in Table 5.

TABLE 5

Melt flow rate and viscosities of samples 2A-2D

| Sample | MFR (g/10 min) | Apparent melt viscosity (Pa·s) measured at selected apparent shear rate (below) | | | |
|---|---|---|---|---|---|
| | | 15 $s^{-1}$ | 20 $s^{-1}$ | 50 $s^{-1}$ | 1000 $s^{-1}$ |
| 2A | 1.8 | 3460 | 2890 | 1660 | 210 |
| 2B | 2.1 | 3160 | 2730 | 1610 | 204 |
| 2C | 2.5 | 2990 | 2620 | 1540 | 195 |
| 2D | 2.9 | 2790 | 2460 | 1460 | 186 |

Each of the polypropylene random copolymer samples 2A-2D were blow molded into 300 mL shampoo bottles on a single-shuttle, single-station W. Müller extrusion blow-molding machine. The barrel temperature was ramped from approximately 180° C. to approximately 190° C., with the extrusion head maintained at a temperature of approximately 180° C. The manifold temperature was maintained at approximately 190° C. The die temperature was set to 180° C. The molten polymer parison was extruded at approximately 190° C. melt temperature into a fine glass bead blasted blow mold that was maintained at a mold temperature of approximately 12° C. The cycle time was set at 10.2 seconds. The final polypropylene bottle weighed approximately 20 grams and measured 1.0 mm in thickness. The bottles produced were then tested as described below.

The percent haze and percent clarity for the side wall of the bottles was measured in accordance with ASTM Standard D1103-92 using a BYK-Gardner Haze-Guard Plus. The gloss of both the inside and outside of the bottle side wall was measured in accordance with ASTM Standard D523 using a BYK-Gardner micro-TRI-gloss at an angle of 60°. The measured percent haze, percent clarity and gloss values for the bottles are shown in Table 6 below.

TABLE 6

Optical Properties of bottles made from Samples 2A-2D.

| Sample | Haze (%) | Clarity (%) | Inside Gloss (Gloss units) | Outside Gloss (Gloss units) |
|---|---|---|---|---|
| 2A | 21 | 66 | 64 | 40 |
| 2B | 20 | 67 | 78 | 40 |
| 2C | 19 | 77 | 92 | 54 |
| 2D | 18 | 85 | 100 | 78 |

As can be seen from the data in Table 6, the sample possessing the desired apparent melt viscosity (e.g., Sample 2D) exhibited a desirable combination of low haze, high clarity, and high gloss (both inside and outside). Indeed, the outside gloss for Sample 2D was dramatically higher than the gloss for the other samples, all of which contained a similar combination of additives as Sample 2D but did not possess the desired apparent melt viscosity values. This improvement in gloss resulted in a bottle with significantly improved aesthetics.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A method for molding a polymer composition, the method comprising the steps of:
    (a) providing an apparatus comprising a die and a mold cavity, the mold cavity having an interior surface defining a shape for a molded article;
    (b) providing a polymer composition comprising (i) a thermoplastic polyolefin polymer; (ii) a polymer additive selected from the group consisting of nucleating agents, clarifying agents, and combinations thereof; and (iii) a fluoropolymer, wherein the polymer composition has (i) an apparent melt viscosity of about 200 Pas or less at an apparent shear rate of 1,000 s$^{-1}$ and a temperature of 190° C., and (ii) an apparent melt viscosity of 2,550 Pas or less at an apparent shear rate of 20 s$^{-1}$ and a temperature of 190° C.;
    (c) heating the polymer composition to a temperature sufficient to melt the polymer composition so that it may be extruded through the die;
    (d) extruding the molten polymer composition through the die to form a parison;
    (e) capturing the parison in the mold cavity;
    (f) blowing a pressurized fluid into the parison under sufficient pressure to inflate the parison so that it conforms to the interior surface of the mold cavity and produces a molded article;
    (g) allowing the molded article to cool to a temperature at which the polymer composition at least partially solidifies so that the molded article retains its shape; and
    (h) removing the molded article from the mold cavity.

2. The method of claim 1, wherein the thermoplastic polyolefin polymer is selected from the group consisting of polypropylene homopolymers, polypropylene copolymers, and combinations thereof.

3. The method of claim 2, wherein the thermoplastic polyolefin polymer is a polypropylene random copolymer.

4. The method of claim 1, wherein the polymer additive is a clarifying agent comprising an acetal compound conforming to the structure of Formula (I) below:

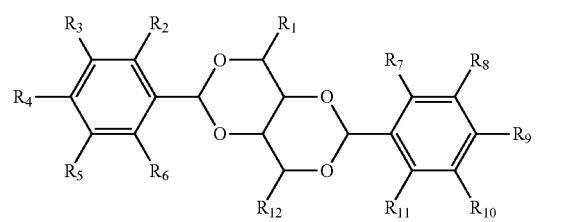

(I)

wherein $R_1$ is selected from the group consisting of hydrogen, alkyl groups, alkenyl groups, hydroxyalkyl groups, alkoxy groups, and alkyl halide groups; wherein $R_2$, $R_3$, $R_4$, $R_5$, $R_6$, $R_7$, $R_8$, $R_9$, $R_{10}$, and $R_{11}$ are each independently selected from the group consisting of hydrogen, alkyl groups, alkoxy groups, alkenyl groups, aryl groups, and halogens; and wherein $R_{12}$ is a hydroxyalkyl group selected from the group consisting of —$CH_2OH$ and —$CHOHCH_2OH$.

5. The method of claim 4, wherein $R_1$ is selected from the group consisting of alkyl groups and alkenyl groups; $R_2$, $R_3$, $R_5$, $R_6$, $R_7$, $R_8$, $R_{10}$, and $R_{11}$ are each hydrogen; $R_{12}$ is —$CHOHCH_2OH$; and $R_4$ and $R_9$ are selected from the group consisting of alkyl groups and alkoxy groups.

6. The method of claim 5, wherein $R_1$, $R_4$ and $R_9$ are n-propyl groups.

7. The method of claim 1, wherein the fluoropolymer has a Melt Flow Index of about 4 to about 30 g/10 minutes as measured in accordance with ASTM D1238-04c at 265° C. using a 5 kg weight.

8. The method of claim 1, wherein the fluoropolymer is a polymer made from at least one monomer selected from the group consisting of vinylidene fluoride, hexafluoropropylene, chlorotrifluoroethylene, tetrafluoroethylene, perfluoro (alkyl vinyl ether), and combinations thereof.

9. The method of claim 1, wherein the fluoropolymer is present in the polymer composition in an amount of about 200 ppm or less, based on the total weight of the polymer composition.

10. The method of claim 1, wherein the polymer composition has an apparent melt viscosity of 1,500 Pa·s or less at an apparent shear rate of 50 $s^{-1}$ and a temperature of 190° C.

11. The method of claim 10, wherein the polymer composition has an apparent melt viscosity of 3000 Pa·s or less at an apparent shear rate of 15 $s^{-1}$ and a temperature of 190° C.

* * * * *